(12) United States Patent
Kim et al.

(10) Patent No.: US 10,421,479 B2
(45) Date of Patent: Sep. 24, 2019

(54) REDUCER OF ELECTRIC POWER STEERING APPARATUS

(71) Applicant: MANDO CORPORATION, Pyeongtaek-si, Gyeonggi-do (KR)

(72) Inventors: Jong Han Kim, Seoul (KR); Hee Chul An, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 304 days.

(21) Appl. No.: 15/365,550

(22) Filed: Nov. 30, 2016

(65) Prior Publication Data

US 2017/0166239 A1 Jun. 15, 2017

(30) Foreign Application Priority Data

Dec. 15, 2015 (KR) .................. 10-2015-0179028

(51) Int. Cl.
*F16H 1/16* (2006.01)
*F16H 1/20* (2006.01)
(Continued)

(52) U.S. Cl.
CPC ........... *B62D 5/008* (2013.01); *B62D 5/0403* (2013.01); *F16H 55/06* (2013.01); *F16H 55/22* (2013.01); *B62D 3/04* (2013.01); *F16H 2055/065* (2013.01)

(58) Field of Classification Search
CPC ................................................ F16H 2055/065
(Continued)

(56) References Cited

U.S. PATENT DOCUMENTS

2002/0178853 A1* 12/2002 Konishi .................. F16H 55/06
74/457
2009/0282939 A1* 11/2009 Rogowski ............... F16H 55/06
74/424.5
(Continued)

FOREIGN PATENT DOCUMENTS

| CN | 101334090 A | 12/2008 |
|---|---|---|
| KR | 10-2008-0030814 A | 4/2008 |
| KR | 10-2012-0136916 A | 12/2012 |

OTHER PUBLICATIONS

Chinese Office Action dated Sep. 21, 2018 issued in Chinese Patent Application No. 201611159944.9.

*Primary Examiner* — Jake Cook
(74) *Attorney, Agent, or Firm* — Morgan, Lewis & Bockius LLP

(57) ABSTRACT

A reducer of an electric power steering apparatus comprises a worm wheel and a worm shaft connected to a motor shaft, the worm wheel and the worm shaft being engaged with each. The worm wheel includes: a ring-shaped hub into which the steering shaft is inserted and having a plurality of outer protrusions formed on the outer peripheral side thereof; a teeth-shaped part, engaged with the worm shaft and formed on the outer peripheral surface thereof, and inner protrusions, formed on the inner peripheral surface thereof, protruding in a radial direction, and formed in the circumferential direction; a ring-shaped insert ring inserted into the inner side of the teeth-shaped part and having support protrusions formed on the outer peripheral side thereof; and a boss integrally injection-molded between the outer peripheral side of the hub and the inner peripheral side of the teeth-shaped part.

8 Claims, 12 Drawing Sheets

(51) Int. Cl.
*B62D 5/00* (2006.01)
*B62D 5/04* (2006.01)
*F16H 55/06* (2006.01)
*F16H 55/22* (2006.01)
*B62D 3/04* (2006.01)

(58) Field of Classification Search
USPC .................................................. 74/DIG. 10
See application file for complete search history.

(56) References Cited

U.S. PATENT DOCUMENTS

| | | | |
|---|---|---|---|
| 2012/0067151 A1* | 3/2012 | Kikuchi | F16H 55/06 74/425 |
| 2012/0227529 A1* | 9/2012 | Fischer | F02N 15/046 74/434 |
| 2013/0228028 A1* | 9/2013 | Kim | B62D 5/0409 74/434 |
| 2016/0047453 A1* | 2/2016 | Ohmi | B29C 45/0005 74/434 |

* cited by examiner

REDUCER OF ELECTRIC POWER STEERING APPARATUS

CROSS REFERENCE TO RELATED APPLICATION

This application claims priority from Korean Patent Application No. 10-2015-0179028, filed on Dec. 15, 2015, which is hereby incorporated by reference for all purposes as if fully set forth herein.

BACKGROUND OF THE INVENTION

1. Field of the Invention

The present invention relates to a reducer of an electric power steering apparatus and, more specifically, to a reducer of an electric power steering apparatus which improves the formability and the accuracy of a worm wheel and increases the mechanical strength and the durability of the worm wheel when a high-energy electric power is transferred to a steering shaft from a worm shaft through the worm wheel, thereby being stably used for a long time.

2. Description of the Prior Art

In general, a power assisted-steering apparatus mounted on a vehicle includes an electric power steering apparatus in which a steering power is controlled by a motor. The electric power steering apparatus accurately drives a motor in an electronic control system according to a vehicle's driving condition detected by various sensors such as a speed sensor and a steering torque sensor, and a torque generated by the motor is transferred to a steering column or a pinion through a reducer so as to assist a steering power of a driver who operates a steering wheel connected to the steering column and the pinion.

Accordingly, the electric power steering apparatus provides a steering performance which enables a driver to maintain an optimum steering condition. For example, the electric power steering apparatus provides a light and comfortable steering state at the time of driving at a low speed and a heavy and stable steering state at the time of driving at a high speed and enables a driver in an accidental emergency situation to perform rapid steering to cope with the emergency situation.

Such an electric power steering apparatus may be divided into various types according to a mounting position. A reducer including a motor is usually installed at a steering column area for fixing a steering shaft, which connects a steering wheel of a driver's seat to a gearbox in a lower portion of a vehicle, to a framework or at a gearbox area in which a pinion coupled to a rack bar is mounted. The electric power steering apparatus allows a rotational force of a steering wheel which is operated by a driver to be transferred to a rack bar by the motor and the reducer.

FIG. 1 is a cross-section which illustrates an inner structure of a reducer of a conventional electric power steering apparatus.

A conventional reducer includes a worm shaft 104 made of a metal such as steel and having a worm 102 formed in the center portion of the worm shaft, worm bearings 106 are installed on both ends of the worm shaft 104, respectively, to support the worm shaft 104, and the worm shaft 104 is connected to a motor shaft 108 such that the worm shaft 104 is rotated by the driving of a motor 110.

A worm wheel 114 made of, for example, a resin composition, is placed on one side of an outer diameter of the worm 102 so as to be engaged with the worm 102, as a reduction gear, formed in the center portion of the worm shaft 104, and the worm wheel 114 is mounted on a steering shaft 112 for transferring a rotational force of a steering wheel (not shown) which is operated by a driver, such that a rotational force of the worm shaft 104, by the driving of the motor 110, is transferred to the steering shaft 112. The worm wheel 114 and the worm shaft 104 engaged by a worm-gear scheme are mounted in the inside of a housing 116 to be protected from the outside.

An electronic control device (not shown) mounted on a vehicle controls the driving of the motor 110 according to a driving condition of the vehicle, and a rotational force of the worm shaft 104 by the driving of the motor 110 is added to a rotational force of the steering wheel which is operated by a driver and is transferred to the steering shaft 112, thereby maintaining a driver's steering-driving condition to be smoothly and stably.

In this case, the worm wheel of the reducer as described above reduces the number of rotations of the motor and transfers the reduced rotation to the steering shaft. As described above, a gear made of a resin composition and a gear made of a metal may be formed in a pair.

However, since the conventional reducer has a structure in which a worm shaft, a worm wheel, and a steering shaft which rotate are engaged with each other, the vibration and noise generated by rotation may be directly and very loudly transferred to a driver and the durability of internal components of the reducer may decrease or the components may be damaged in extreme cases.

Especially, when driving on a bumpy road, a load transferred from a wheel through a rack bar and a steering shaft instantaneously increases, and as a result of the increment, the vibration and noise generated in the reducer may further increase to cause discomfort to a driver.

SUMMARY OF THE INVENTION

The present invention has been made in view of the background described above, and relates to a reducer of an electric power steering apparatus. The purpose of the present invention is to improve the formability and the accuracy of a worm wheel, increase the mechanical strength and the durability of the worm wheel when a high-energy electric power is transferred to a steering shaft from a worm shaft through the worm wheel, and thus enable a reducer to be stably used for a long time.

In order to achieve the purpose, the present invention provides a reducer of an electric power steering apparatus, the reducer comprising a worm wheel and a worm shaft connected to a motor shaft, the worm wheel and the worm shaft being engaged with each other to provide an auxiliary steering power to a steering shaft, wherein the worm wheel includes: a ring-shaped hub into which the steering shaft is inserted and having a plurality of outer protrusions formed on the outer peripheral side thereof, the plurality of outer protrusions being spaced in a circumferential direction; a teeth-shaped part including gear teeth, which are engaged with the worm shaft and are formed on the outer peripheral surface thereof, and inner protrusions, which are formed on the inner peripheral surface thereof, protrude in a radial direction, and are formed in the circumferential direction; a ring-shaped insert ring inserted into the inner side of the teeth-shaped part and having support protrusions formed on the outer peripheral side thereof; and a boss which is integrally injection-molded between the outer peripheral side of the hub and the inner peripheral side of the teeth-shaped part.

In addition, the present invention provides a reducer of an electric power steering apparatus, the reducer comprising a worm wheel and a worm shaft connected to a motor shaft, the worm wheel and the worm shaft being engaged with each other to provide an auxiliary steering power to a steering shaft, wherein the worm wheel includes: an insert disc including a small diameter portion having a shaft connection hole formed at a central portion thereof, and a large diameter portion having support protrusions formed on an outer peripheral side thereof, wherein the steering shaft is inserted in the shaft connection hole; and a teeth-shaped part integrally injection-molded on the outer peripheral side of the insert disc, the teeth-shaped part including gear teeth which are engaged with the worm shaft and are formed on the outer peripheral surface thereof, and concave groove parts which are formed on the inner peripheral surface thereof, the support protrusions of the large diameter portion being inserted in the concave groove parts.

According to the present invention, the reducer of the electric power steering apparatus can improve the formability and the accuracy of a worm wheel and increase the mechanical strength and the durability of the worm wheel when a high-energy electric power is transferred to a steering shaft from a worm shaft through the worm wheel, thereby being stably used for a long time.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
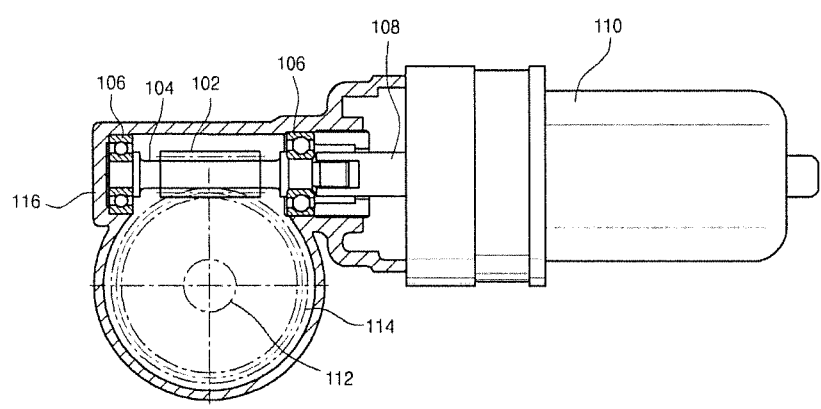
FIG. 1 is a cross-sectional view which illustrates an inner structure of a reducer of a conventional electric power steering apparatus.

Hereinafter, embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
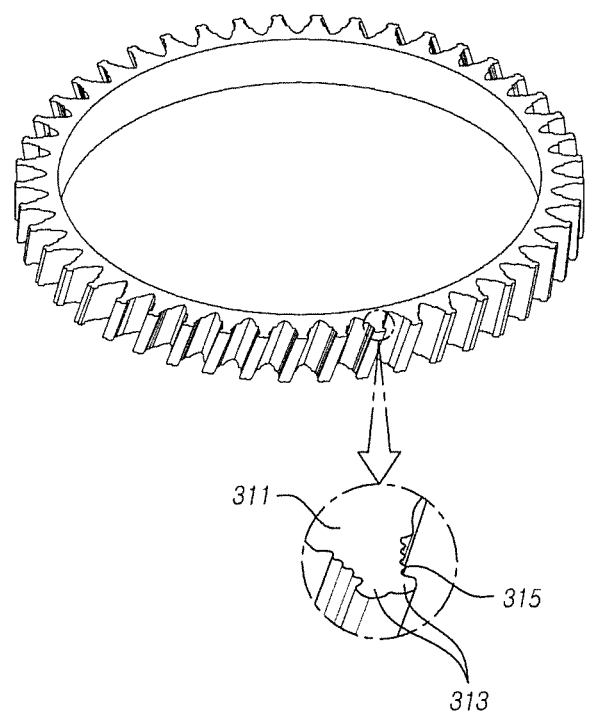
FIG. 2 is a perspective view which illustrates a part of a reducer of an electric power steering apparatus according to the present invention.
Figure 3:
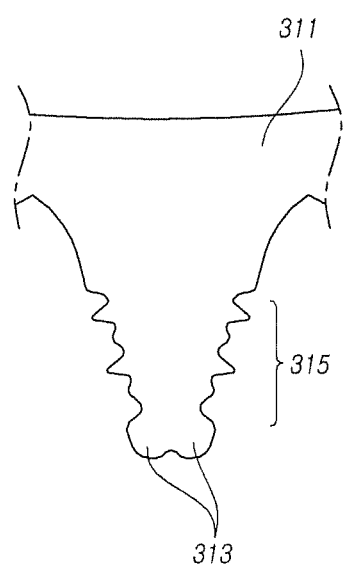
FIG. 3 and FIG. 4 are a plan view which illustrates a part of a reducer of an electric power steering apparatus according to the present invention.
Figure 4:
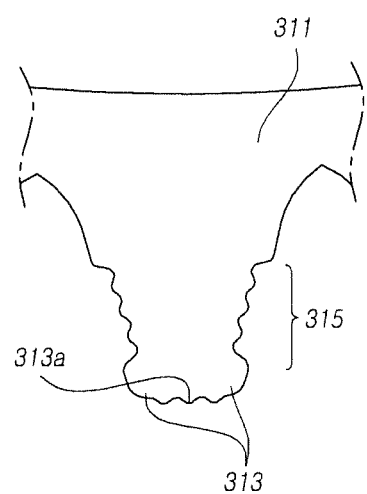
Figure 5:
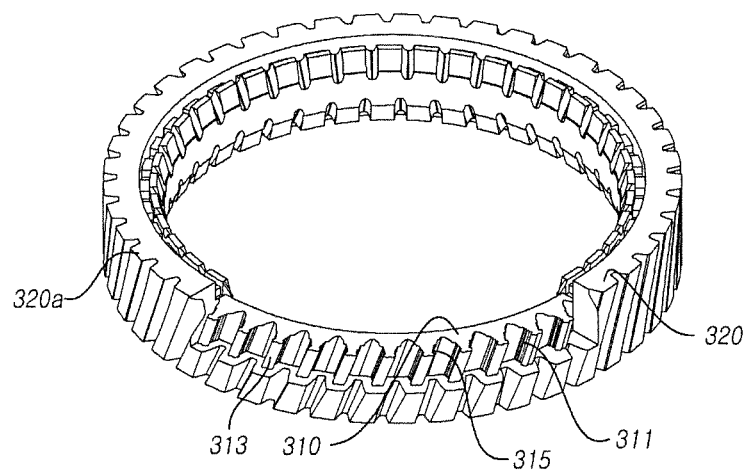
FIG. 5 is a partially cut-out perspective view of a reducer of an electric power steering apparatus according to the present invention.
Figure 6:
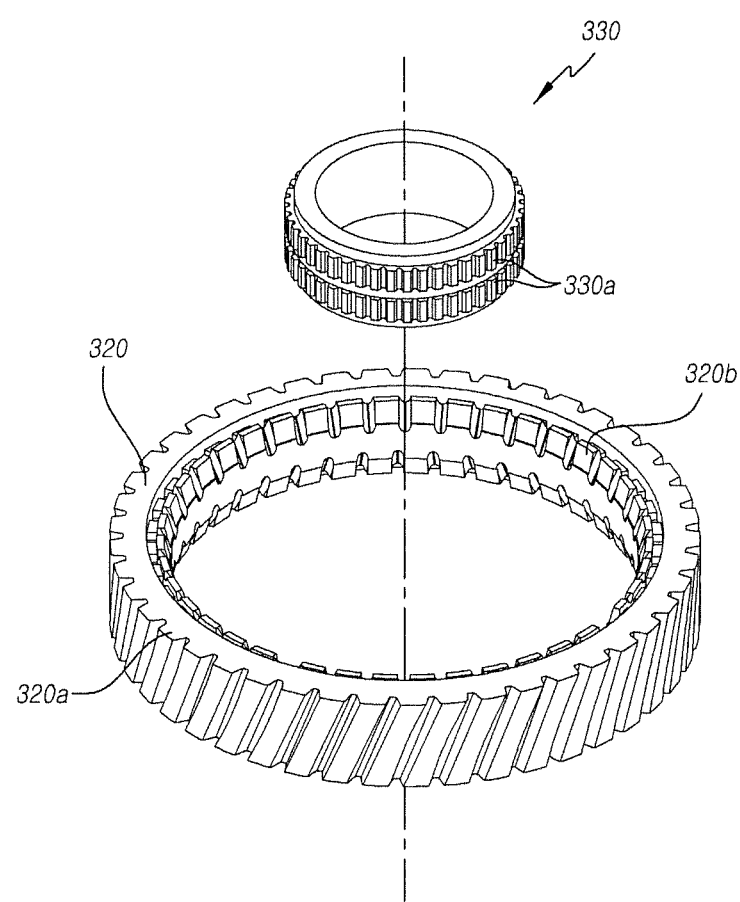
FIG. 6 is an exploded perspective view which illustrates a part of a reducer of an electric power steering apparatus according to the present invention.
Figure 7:
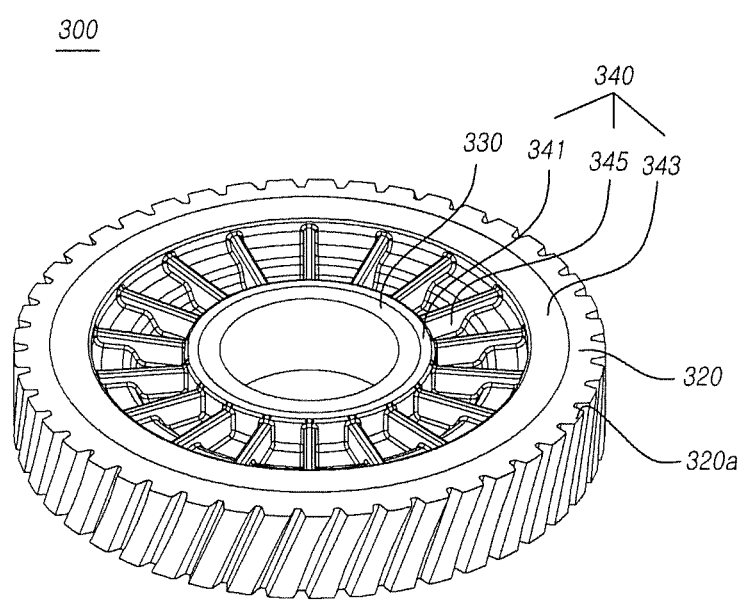
FIG. 7 is a perspective view which illustrates a worm wheel of a reducer of an electric power steering apparatus according to the present invention.
Figure 8:
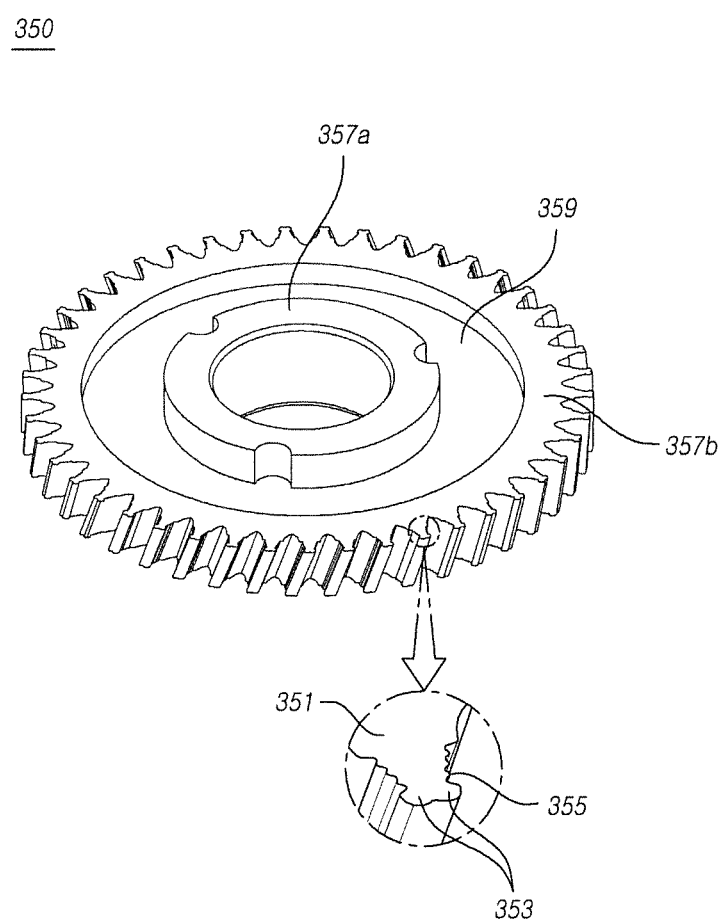
FIG. 8 is a perspective view including a sectional view of a part of a worm wheel of a reducer of an electric power steering apparatus according to another embodiment of the present invention.
Figure 9:
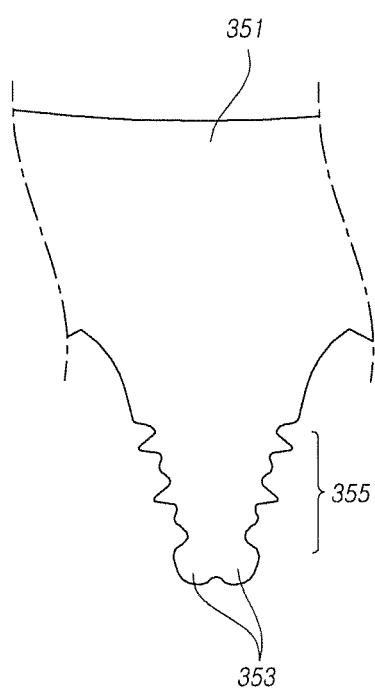
FIG. 9 and FIG. 10 are a plan view which illustrates a part of a reducer of an electric power steering apparatus according to the present invention.
Figure 10:
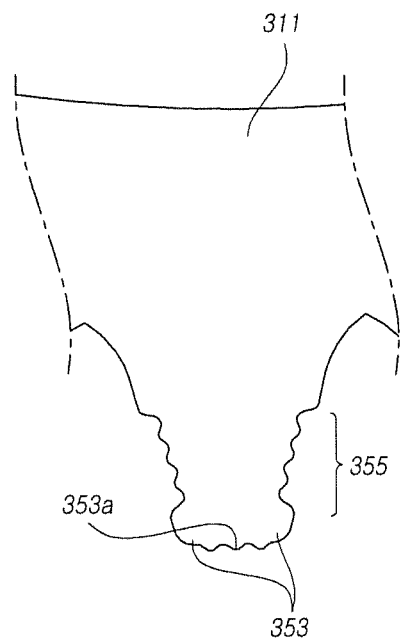
Figure 11:
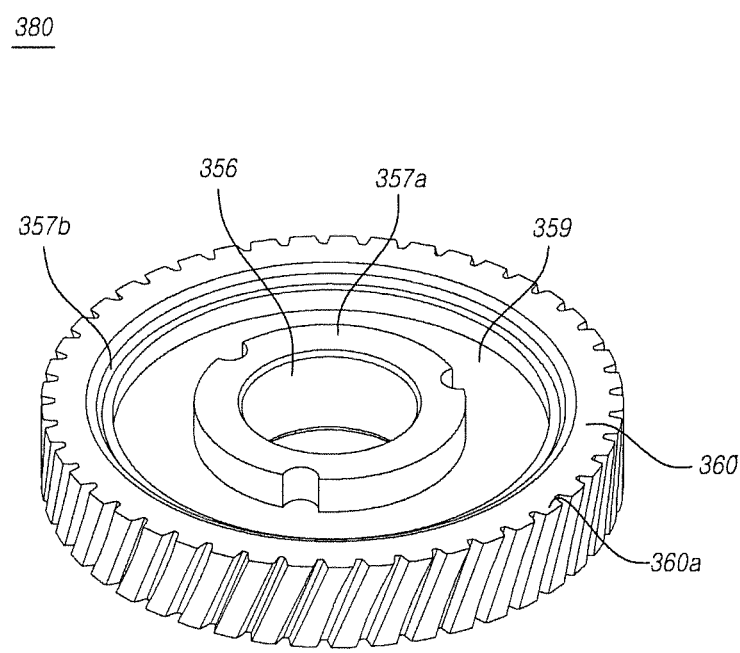
FIG. 11 is a perspective view including a sectional view of a part of a worm wheel of a reducer of an electric power steering apparatus according to still another embodiment of the present invention.
Figure 12:
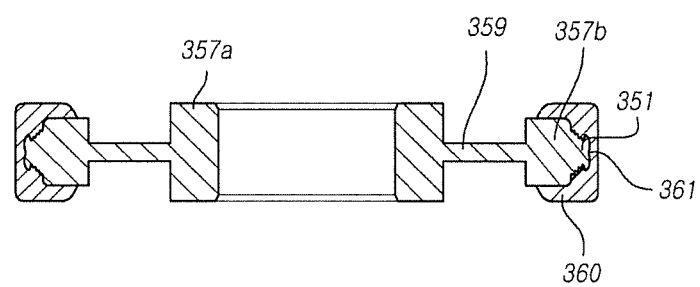
FIG. 12 is a cross-sectional view of FIG. 11.

FIG. 2 is a perspective view which illustrates a part of a reducer of an electric power steering apparatus according to the present invention, FIG. 3 and FIG. 4 are a plan view which illustrates a part of a reducer of an electric power steering apparatus according to the present invention, FIG. 5 is a partially cut-out perspective view of a reducer of an electric power steering apparatus according to the present invention, FIG. 6 is an exploded perspective view which illustrates a part of a reducer of an electric power steering apparatus according to the present invention, FIG. 7 is a perspective view which illustrates a worm wheel of a reducer of an electric power steering apparatus according to the present invention, FIG. 8 is a perspective view including a sectional view of a part of a worm wheel of a reducer of an electric power steering apparatus according to another embodiment of the present invention, FIG. 9 and FIG. 10 are a plan view which illustrates a part of a reducer of an electric power steering apparatus according to the present invention, FIG. 11 is a perspective view including a sectional view of a part of a worm wheel of a reducer of an electric power steering apparatus according to still another embodiment of the present invention, and FIG. 12 is a cross-sectional view of FIG. 11.

Referring to FIG. 2 to FIG. 7, in the reducer of the electric power steering apparatus according to the present invention, a worm wheel 300 includes: a ring-shaped hub 330 into which a steering shaft is inserted and having a plurality of outer protrusions 330a formed on the outer peripheral side thereof, the plurality of outer protrusions being spaced in a circumferential direction; a teeth-shaped part 320 including gear teeth 320a, which are engaged with the worm shaft and are formed on the outer peripheral surface thereof, and inner protrusions 320b, which are formed on the inner peripheral surface thereof, protrude in a radial direction, and are formed in the circumferential direction; a ring-shaped insert ring 310 inserted into the inner side of the teeth-shaped part 320 and having support protrusions 311 formed on the outer peripheral side thereof; and a boss 340 which is integrally injection-molded between the outer peripheral side of the hub 330 and the inner peripheral side of the teeth-shaped part 320.

In the reducer, a rotational force is transferred by a medium of the worm shaft (see 104 in FIG. 1) and the worm wheel 300 which are rotated by a driving power of a motor, and is reduced or accelerated according to a gear ratio of the worm shaft and a worm wheel gear. The reducer includes a metal worm shaft having a worm gear formed therein and a worm wheel 300 formed on one side of the outer diameter of the worm shaft so as to be engaged with the worm gear formed on the outer circumference of the worm shaft.

Such a reducer is mounted on an electric power steering apparatus and assists a steering power of a driver by rotating the steering shaft through interworking between the worm shaft and the worm wheel by a driving power of the motor. A worm shaft bearing is fastened on both ends of the worm shaft interworking with a shaft of the motor when driving the motor so as to support rotation of the worm shaft, and the worm shaft and the worm wheel interworking with the steering shaft are mounted in a gear housing.

Meanwhile, the steering shaft, which transfers a rotational force of a steering wheel to a rack bar when a driver operates the steering wheel, may be connected from the steering wheel up to a column, a universal joint, a gear box having a rack gear and a pinion gear mounted therein, and the reducer may be coupled to the steering shaft (or a pinion) mounted in the gear box.

Accordingly, when the worm shaft rotates by the driving of the motor, the worm wheel connected thereto rotates. Then, the worm wheel is coupled to a steering shaft of the column or a steering shaft of the gear box so as to assist a steering power of a driver.

In this case, the worm wheel 300 includes a hub 330 to which the steering shaft is coupled, a boss 340 integrally formed on the outer peripheral side of the hub 330, and a teeth-shaped part 320 integrally formed on the outer peripheral side of the boss 340 and engaged with the worm shaft.

The hub 330 made of a steel material is formed to have a substantially hollow shape like a ring, the central portion of which the steering shaft extends through and is coupled to. A plurality of outer protrusions 330a having a predetermined interval in the circumferential direction are formed on the outer peripheral surface of the hub 330.

Meanwhile, the teeth-shaped part 320 is integrally injection-molded with an insert ring 310 in a state in which the insert ring 310 has been inserted thereinto, and includes gear teeth 320a, which are engaged with the worm shaft and are formed on the outer peripheral surface thereof.

In addition, the boss 340 is integrally injection-molded between the outer peripheral side of the hub 330 and the inner peripheral side of the teeth-shaped part 320. Specifically, the boss 340 is integrally formed by placing the hub 330 in the inner center of the teeth-shaped part 320 integrally injection-molded with the insert ring 310 and then injecting plastic resin thereto.

In this case, the insert ring 310 has a plurality of support protrusions 311, which are connected in the circumferential direction, to improve the coupling strength and the durability strength while preventing the insert ring 310 from being separated from the teeth-shaped part 320 when being injection-molded with the teeth-shaped part 320.

The support protrusions 311 have a width decreasing outward in the radial direction and include end protrusions 313 protruding toward both sides in the circumferential direction at the radially outermost portion of the support protrusion 311. Therefore, the separation strength with respect to the teeth-shaped part 320 increases not only in the radial direction but also in the circumferential direction, so that the insert ring 310 can satisfy the durability strength even when a high-energy electric power is transferred.

In addition, a plurality of connection protrusions 315 connected to the end protrusions 313 are formed on both side surfaces of the support protrusions 311. The teeth-shaped part 320 is formed by filling plastic resin between the connection protrusions 315 and the end protrusions 313, so that the insert ring 310 can have further improved durability strength and separation strength with respect to the teeth-shaped part 320.

As shown in FIG. 3, the connection protrusions 315 may be formed with different protruding sizes, and a connection protrusion 315 having a large protruding size and a connection protrusion 315 having a smaller protruding size are alternately arranged so as to increase the coupling strength and the durability strength while preventing the insert ring 310 from being separated from the teeth-shaped part 320 when the insert ring 310 is injection-molded with the teeth-shaped part 320.

In addition, as shown in FIG. 4, the support protrusion 311 may include outer peripheral surface protrusions 313a on the outer peripheral surface between the end protrusions 313. The outer peripheral surface protrusions 313a have a smaller protruding size than that of the end protrusion 313 so as to increase the separation strength with respect to the teeth-shaped part 320 in the circumferential direction, so that the durability strength can be satisfied while preventing the insert ring 310 from being separated from the teeth-shaped part 320 even when a high-energy electric power is transferred.

The teeth-shaped part 320 is formed by injecting glass fiber-mixed reinforced polyamide (PA) resin, and the polyamide resin which forms the teeth-shaped part 320 is one among polyamide 6, polyamide 66, polyamide 46, and polyamide 12 and is formed by mixing the polyamide resin and 25 to 50 wt % of glass fiber, thereby improving the abrasion resistance and the durability.

Further, the boss 340 is formed by injecting glass fiber-mixed reinforced polyamide resin between the outer side of the hub 330 and the inner side of the teeth-shaped part 320.

That is, the boss 340 includes an inner cylindrical part 341 connected thereto while surrounding the outer peripheral surface of the hub 330 and an outer cylindrical part 343 connected thereto while surrounding the inner peripheral surface of the teeth-shaped part 320. The inner cylindrical part 341 and the outer cylindrical part 343 are integrally injection-molded in a mold such that the inner cylindrical part 341 and the outer cylindrical part 343 are connected with each other through a plurality of ribs 345 formed in the radial direction.

In this case, polyamide resin for injection-molding the boss 340 may be one among polyamide 6, polyamide 66, polyamide 46, and polyamide 12 and may be formed by mixing the polyamide resin and 25 to 50 wt % of glass fiber. Accordingly, in comparison with the case in which the boss is formed of only polyamide resin, the boss has improved hardness, tensile strength, elongation, flexural rigidity, high temperature physical properties, has excellent friction characteristics, and thus has an improved durability.

Meanwhile, referring to FIG. 8 to FIG. 12, in the reducer of the electric power steering apparatus according to the present invention, a worm wheel 380 includes: an insert disc 350 including a small diameter portion 357a having a shaft connection hole 356 formed at a central portion thereof, and a large diameter portion 357b having support protrusions 351 formed on an outer peripheral side thereof, wherein a steering shaft is inserted in the shaft connection hole; and a teeth-shaped part 360 integrally injection-molded on the outer peripheral side of the insert disc 350, the teeth-shaped part 360 including gear teeth 360a which are engaged with the worm shaft and are formed on the outer peripheral surface thereof, and concave groove parts 361 which are formed on the inner peripheral surface thereof, the support protrusions 351 of the large diameter portion 357b being inserted in the concave groove parts 361.

The insert disc 350 includes the small diameter portion 357a having the shaft connection hole 356 formed at the central portion thereof, and the large diameter portion 357b having the support protrusions 351 formed on the outer peripheral side thereof, wherein the steering shaft is inserted in the shaft connection hole 356.

In addition, the teeth-shaped part 360 is integrally injection-molded on the outer peripheral side of the insert disc 350 and includes the gear teeth 360a, which are engaged with the worm shaft and are formed on the outer peripheral surface thereof and the concave groove parts 361 which are formed on the inner peripheral surface thereof, the support protrusions 351 of the large diameter portion 357b being inserted in the concave groove parts 361.

The insert disc 350 includes a connection part 359 connecting the small diameter portion 357a and the large diameter portion 357b in the radial direction, and the connection part 359 is formed to be stepped with the small diameter portion 357a and the large diameter portion 357b in an axial direction, thereby improving the torsional strength of the insert disc 350 and reducing the weight of the entire worm wheel at the same time.

Further, the teeth-shaped part 360 is integrally injection-molded with the insert disc 350 while surrounding one side surface and the other side surface of the large diameter portion 357b.

In this case, the insert disc 350 has a plurality of support protrusions 351, which are connected in the circumferential direction, to improve the coupling strength and the durability strength while preventing the insert disc 350 from being separated from the teeth-shaped part 360 when being injection-molded with the teeth-shaped part 360.

In addition, the support protrusions 351 have a width decreasing outward in the radial direction and include end protrusions 353 protruding toward both sides in the circumferential direction at the radially outermost portion of the support protrusion 351. Therefore, the separation strength with respect to the teeth-shaped part 360 increases not only in the radial direction but also in the circumferential direction, so that the insert disc 350 can satisfy the durability strength even when a high-energy electric power is transferred.

In addition, a plurality of connection protrusions 355 connected to the end protrusions 353 are formed on both side surfaces of the support protrusions 351. Therefore, the teeth-shaped part 360 is formed by filling a plastic resin between the connection protrusions 355 and the end protrusions 353, so that the insert disc 350 can have further improved durability strength and separation strength with respect to the teeth-shaped part 360.

As shown in FIG. 9, the connection protrusions 355 may be formed with different protruding sizes, and a connection protrusion 355 having a large protruding size and a connection protrusion 355 having a smaller protruding size are alternately arranged so as to increase the coupling strength and the durability strength while preventing the insert disc 350 from being separated from the teeth-shaped part 360 when the insert disc 350 is injection-molded with the teeth-shaped part 360.

In addition, as shown in FIG. 10, the support protrusion 351 may include outer peripheral surface protrusions 353a on the outer peripheral surface between the end protrusions 353. The outer peripheral surface protrusions 353a have a smaller protruding size than that of the end protrusion 353 so as to increase the separation strength with respect to the teeth-shaped part 360 in the circumferential direction, so that the durability strength can be satisfied while preventing the insert disc 350 from being separated from the teeth-shaped part 360 even when a high-energy electric power is transferred.

The teeth-shaped part 360 is formed by injecting polyamide (PA) resin, and the polyamide resin which forms the teeth-shaped part 360 may be one among polyamide 6, polyamide 66, polyamide 46, and polyamide 12 and may be formed by mixing the polyamide resin and 25 to 50 wt % of glass fiber.

Accordingly, in comparison with the case in which the teeth-shaped part 360 is formed of only polyamide resin, the boss has improved hardness, tensile strength, elongation, flexural rigidity, high temperature physical properties, has excellent friction characteristics, and thus has an improved durability.

According to the present invention, the reducer of the electric power steering apparatus can improve the formability and the accuracy of a worm wheel and increase the mechanical strength and the durability of the worm wheel when a high-energy electric power is transferred to a steering shaft from a worm shaft through the worm wheel, thereby being stably used for a long time.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A reducer of an electric power steering apparatus, the reducer comprising a worm wheel and a worm shaft connected to a motor shaft, the worm wheel and the worm shaft being engaged with each other to provide an auxiliary steering power to a steering shaft,
   wherein the worm wheel comprises:
   a ring-shaped hub into which the steering shaft is inserted and having a plurality of outer protrusions disposed on an outer peripheral side thereof, the plurality of outer protrusions being spaced in a circumferential direction;

a teeth-shaped part including gear teeth which are engaged with the worm shaft and are disposed on an outer peripheral surface thereof, and inner protrusions which are disposed on an inner peripheral surface thereof, protrude in a radial direction, and are disposed in the circumferential direction;

a ring-shaped insert ring inserted into the inner side of the teeth-shaped part and having support protrusions disposed on an outer peripheral side thereof; and a boss which is integrally injection-molded between an outer peripheral side of the hub and an inner peripheral side of the teeth-shaped part, and wherein a plurality of connection protrusions are disposed on both side surfaces of each of the support protrusions.

2. The reducer of claim 1, wherein the teeth-shaped part is integrally injection-molded with the insert ring.

3. The reducer of claim 2, wherein the support protrusions are connected in the circumferential direction.

4. The reducer of claim 3, wherein each of the support protrusions has a width decreasing outward in the radial direction.

5. The reducer of claim 4, wherein each of the support protrusions includes end protrusions protruding outwardly toward both sides of a radially outermost portion of each of the support protrusions.

6. The reducer of claim 5, wherein the plurality of connection protrusions are connected to the end protrusions.

7. The reducer of claim 6, wherein each of the support protrusions includes outer peripheral surface protrusions on an outer peripheral surface between the end protrusions.

8. The reducer of claim 1, wherein the teeth-shaped part and the boss are formed by mixing one polyamide resin among polyamide 6, polyamide 66, polyamide 46, and polyamide 12 and 25 to 50wt % of glass fiber.

* * * * *